(12) United States Patent
Seo et al.

(10) Patent No.: US 10,870,078 B2
(45) Date of Patent: Dec. 22, 2020

(54) AIR PURIFIER

(71) Applicant: MIRO CO. LTD., Incheon (KR)

(72) Inventors: Dong Jin Seo, Incheon (KR); Yong Ju Oh, Incheon (KR); Min Seok Kim, Incheon (KR); Jeong Won Lee, Incheon (KR)

(73) Assignee: MIRO CO. LTD., Incheon (KR)

( * ) Notice: Subject to any disclaimer, the term of this patent is extended or adjusted under 35 U.S.C. 154(b) by 265 days.

(21) Appl. No.: 15/735,521

(22) PCT Filed: Sep. 29, 2017

(86) PCT No.: PCT/KR2017/011052
§ 371 (c)(1),
(2) Date: Dec. 11, 2017

(87) PCT Pub. No.: WO2018/066957
PCT Pub. Date: Apr. 12, 2018

(65) Prior Publication Data
US 2019/0351363 A1 Nov. 21, 2019

(30) Foreign Application Priority Data
Oct. 6, 2016 (KR) ........................ 10-2016-0129270

(51) Int. Cl.
*B01D 47/02* (2006.01)
*B01D 53/78* (2006.01)

(52) U.S. Cl.
CPC ............. *B01D 47/02* (2013.01); *B01D 53/78* (2013.01); *B01D 2258/0283* (2013.01)

(58) Field of Classification Search
CPC . B01D 47/02; B01D 53/78; B01D 2258/0283
USPC ........................................................... 34/359
See application file for complete search history.

(56) References Cited

U.S. PATENT DOCUMENTS

| | | | | |
|---|---|---|---|---|
| 4,624,777 A | * | 11/1986 | Kallioinen | B03D 1/1456 209/170 |
| 4,666,611 A | * | 5/1987 | Kaelin | C02F 3/16 210/758 |
| 4,889,701 A | * | 12/1989 | Jones | B01D 53/52 423/220 |
| 4,959,183 A | * | 9/1990 | Jameson | B01F 3/04539 209/169 |

(Continued)

FOREIGN PATENT DOCUMENTS

| | | |
|---|---|---|
| JP | 43-011193 B1 | 5/1968 |
| JP | 07-041177 B2 | 5/1995 |

(Continued)

*Primary Examiner* — Stephen M Gravini
(74) *Attorney, Agent, or Firm* — Novick, Kim & Lee, PLLC; Sang Ho Lee

(57) ABSTRACT

An air cleaner according to an exemplary embodiment of the present invention includes a water tank in which water is contained, a rotating shaft which is mounted in the water tank and rotates, and a rotating body which is coupled to the rotating shaft to rotate in a longitudinal direction of the rotating shaft as a rotational axis and formed with a plurality of rotating blades capable of collecting air, in which the rotating shaft is obliquely mounted to form a predetermined angle with a water surface formed by the water contained in the water tank.

13 Claims, 3 Drawing Sheets

(56) References Cited

U.S. PATENT DOCUMENTS

| | | | | |
|---|---|---|---|---|
| 5,730,784 | A * | 3/1998 | Smith | B01D 21/0042 |
| | | | | 210/750 |
| 6,167,637 | B1 * | 1/2001 | Nagase | B01D 29/09 |
| | | | | 34/388 |
| 6,197,262 | B1 | 3/2001 | Del Ben | |
| 7,153,481 | B2 * | 12/2006 | Bengtsson | B01D 53/346 |
| | | | | 423/243.01 |
| 7,971,732 | B2 * | 7/2011 | Weis | B01D 21/2411 |
| | | | | 210/456 |
| 8,845,797 | B2 * | 9/2014 | Iijima | B01D 53/1418 |
| | | | | 96/234 |
| 9,868,093 | B2 * | 1/2018 | Bridson | B03D 1/20 |
| 10,328,385 | B2 * | 6/2019 | Yokoi | F03C 4/00 |
| 2014/0026753 | A1 * | 1/2014 | Hakansson | B01D 3/008 |
| | | | | 95/210 |
| 2019/0039009 | A1 * | 2/2019 | Jun | B03C 3/368 |
| 2019/0145422 | A1 * | 5/2019 | Isaacs | F04D 29/2216 |
| | | | | 415/206 |
| 2019/0351363 | A1 * | 11/2019 | Seo | B01D 47/02 |

FOREIGN PATENT DOCUMENTS

| | | |
|---|---|---|
| JP | 2000-061236 A | 2/2000 |
| JP | 2005-199202 A | 7/2005 |
| KR | 10-0805670 B1 | 2/2008 |
| KR | 10-2009-0081553 A | 7/2009 |
| KR | 10-2009-0089663 A | 8/2009 |
| WO | WO-2018066957 A1 * | 4/2018 ............. B01D 47/02 |

* cited by examiner

AIR PURIFIER

TECHNICAL FIELD

The present invention relates to an air cleaner and more particularly, to an air cleaner using a rotating body which is obliquely rotated to form a predetermined angle with water contained in a water tank.

BACKGROUND ART

In general, an air cleaner is a hygienic device that filters contaminants or fine dust in contaminated air and discharges the cleaned air into a room while forcibly circulating the air in the room by ventilation.

Such an air cleaner may be classified into a filter type and a disk type using water.

The filter type air cleaner uses a filter which catches dust and VOC gas, respectively and has a disadvantage of replacing the filter every predetermined hour.

Activated carbon filters are often used to reduce the VOC gas and even in this case, the filters need to be periodically replaced to secure proper performance.

The disk type air cleaner using water is called an air washer and a type of attaching dust by introducing air containing the dust into a rotating disk.

However, such a disk type air cleaner using water has a problem in that the air cleaning effect is deteriorated.

On the other hand, when it rains, the atmosphere is cleaned because the dust and the VOC gas in the air are washed away or dissolved by the rain. By using such a feature, the air containing the dust is introduced into the water and discharged from the water due to a density difference to obtain an excellent cleaning effect.

In order to implement the cleaning effect, there is proposed a method of rotating a rotating body formed with an air chamber or an air collector in which air can stay while a part of the rotating body is immerged in the water. However, there is a problem in that large energy is consumed when the air is put into the water or when the water is contained in the rotating body and lifted up and noise is generated when the air is discharged or the water drops.

Meanwhile, in the related art, there is disclosed Korean Patent Publication No. 10-2009-0081553 of "Humidifier" (published date: Jul. 29, 2009).

DISCLOSURE

Technical Problem

An object of the present invention is to provide an air cleaner which purifies air using the air discharged from the inside of water after a rotating shaft maintains a predetermined angle with a water surface and a rotating body forming an air chamber rotates.

Another object of the present invention is to provide an air cleaner which maximizes air cleaning efficiency by discharging fine air bubbles in water by coupling a plate having a plurality of through holes to one side of the rotating body.

The objects of the present invention are not limited to the aforementioned objects, and other objects, which are not mentioned above, will be apparent to a person having ordinary skill in the art from the following description.

Technical Solution

An exemplary embodiment of the present invention provides an air cleaner including: a water tank in which water is contained; a rotating shaft which is mounted in the water tank and rotates; and a rotating body which is coupled to the rotating shaft to rotate in a longitudinal direction of the rotating shaft as a rotational axis and formed with a plurality of rotating blades capable of collecting air, in which the rotating shaft is obliquely mounted to form a predetermined angle with a water surface formed by the water contained in the water tank.

At least a part of the upper portion of the water tank may be opened to allow the air to be freely introduced and discharged.

The rotating body may include a rotating center body through-coupled with the rotating shaft and having a hollow shape, and the rotating blades may be formed to be spaced apart from each other at equal intervals along the outer periphery of the rotating center body.

The rotating blade may include a curved portion which is extended from the rotating center body in an outer direction of the rotational axis and formed so that an end thereof is curved in one direction.

The curved portion may be formed so that an end thereof is curved in a rotating direction of the rotating body.

The rotating blade may further include a closure portion which is formed to be extended to one side of the curved portion and collects the air together with the curved portion, and when the rotating blades rotate, the air outside the water may be introduced into the water and the introduced air is discharged from the inside of the water.

As the rotating blades rotate, the other side of the curved portion may be opened to discharge the water collected together with the air.

The rotating blades may be installed with a disk-shaped plate which is coupled to one side of the curved portion and collects the air together with the curved portion, and when the rotating blades rotate, the air outside the water may be introduced into the water and the introduced air is discharged from the inside of the water.

The plate may include a closure portion for collecting the air together with the curved portion to introduce the collected air into the water, and air crush portions which discharge the collected air from the inside of the water when the rotating blades rotate and are formed to penetrate the plate in a thickness direction to crush and discharge the discharged air into a plurality of air bubbles.

As the rotating blades rotate, the other side of the curved portion may be opened to discharge the water collected together with the air.

The water tank may include an air introduction portion mounted with a fan for forcibly introducing air outside the water tank.

The water tank may include an air discharge port which is formed to be opened to discharge the air in the water tank.

A plurality of rotating bodies may be formed and the plurality of rotating bodies may have different sizes so that lowest heights thereof coincide with each other based on the bottom of the water tank.

Advantageous Effects

According to the present invention, it is possible to actively purify air when air is introduced to water and discharged from the inside of the water, unlike the related art in which an air cleaner operates using water by a passive method.

Further, a rotating body is obliquely mounted to form a predetermined angle with a water surface formed by the water contained in the water tank, thereby introducing external air into water by using low energy.

Further, as the other side of a curved portion is opened, the water gathered inside the curved portion at the time of rotating may be easily discharged to the outside by rotating the rotating body.

Further, a contact surface area between the air and the water is maximized by using a rotary blade having an air crush portion, thereby largely improving air purification efficiency.

Further, a plurality of rotating bodies may be formed and the number of rotating bodies is increased according to the size of the water tank, thereby improving the air purification efficiency.

BEST MODE

Figure 1:
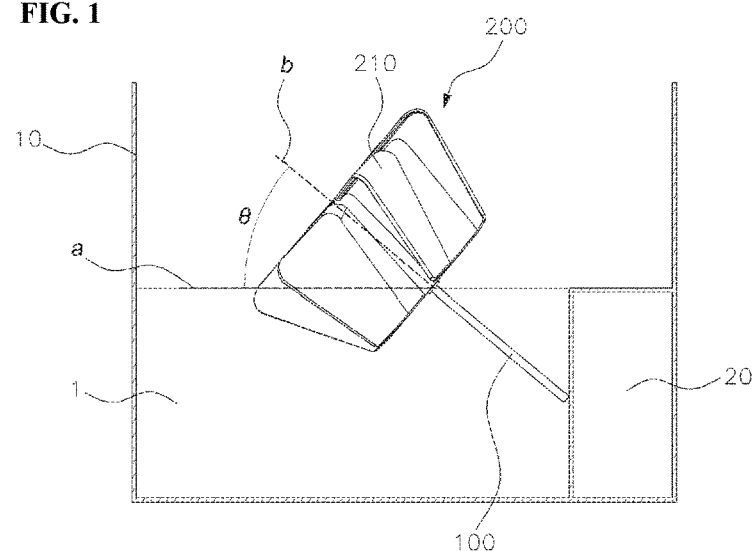
FIG. 1 is a schematic diagram of an air cleaner according to an exemplary embodiment of the present invention.

Advantages and features of the present invention, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the disclosure, and the present invention will be defined by the appended claims. Throughout the whole specification, like reference numerals designate like components.

Figure 2A:
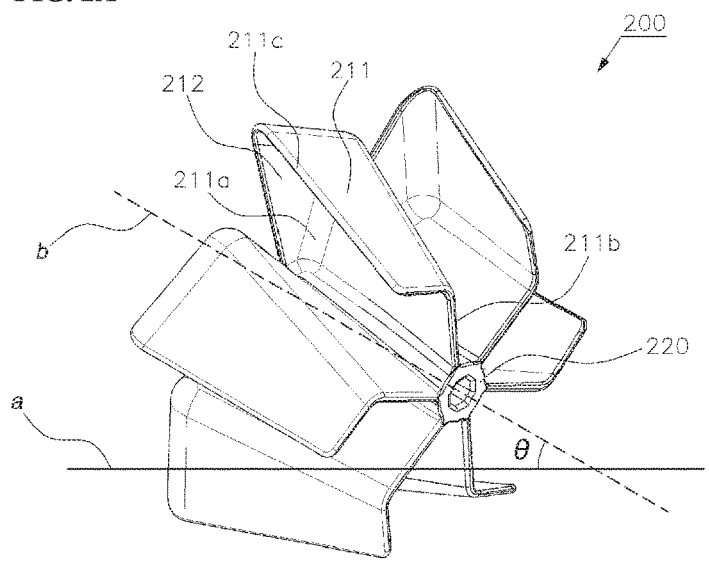
FIG. 2A is a perspective view of a rotating body according to the exemplary embodiment of the present invention.
Figure 2B:
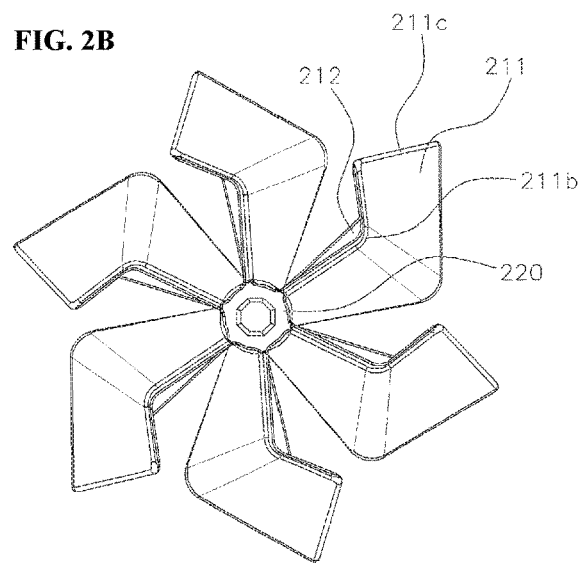
FIG. 2B is a front view of the rotating body according to the exemplary embodiment of the present invention.
Figure 2C:
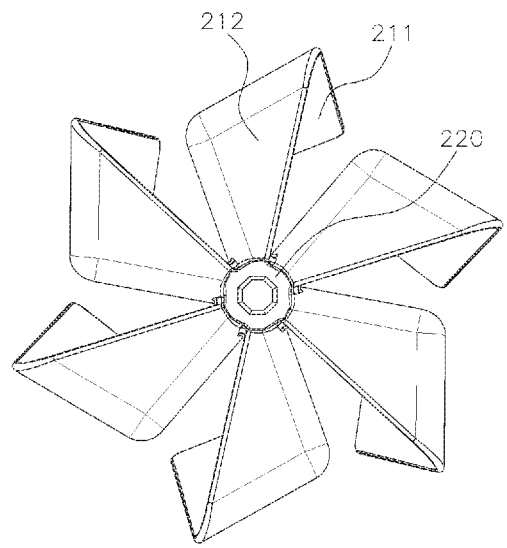
FIG. 2C is a rear view of the rotating body according to the exemplary embodiment of the present invention.

FIG. 1 is a schematic diagram of an air cleaner according to an exemplary embodiment of the present invention, FIG. 2A is a perspective view of a rotating body according to the exemplary embodiment of the present invention, FIG. 2B is a front view of the rotating body according to the exemplary embodiment of the present invention, and FIG. 2C is a rear view of the rotating body according to the exemplary embodiment of the present invention.

Referring to FIGS. 1, 2A, and 2C, an air cleaner according to an exemplary embodiment of the present invention includes a water tank 10, a rotating shaft 100 disposed in the water tank 10, a rotating body 200, a driver 20, and a controller capable of controlling all configurations including the driver 20.

The water tank 10 is a configuration for containing water 1 and may have a space for containing the water 1 therein. For example, the water thank 10 is illustrated in a square pillar shape, but the shape is not limited thereto and may include various shapes such as various polygonal shapes or cylindrical shapes.

Meanwhile, at least a part of the upper portion of the water tank 10 is opened to allow the air to be freely introduced and discharged and in this case, ambient air may be introduced or discharged in a natural manner.

The rotating shaft 100 is mounted in the water tank 10 and rotates, and the rotating body 200 is coupled to the rotating shaft 100 to rotate in a longitudinal direction of the rotating shaft 100 as a rotational axis and may be formed with a plurality of blades capable of collecting the air.

One end of the rotating shaft 100 may be connected with the driver 20 for providing rotation driving force and a motor and the like may be included in the driver 20.

The rotating shaft 100 may be formed by penetrating the center of the rotating body 200 and the other end of the rotating body 200 may be connected to the rotating body 200 or connected to the water tank 10 through the rotating body 200.

At this time, the rotating shaft 100 may be obliquely mounted so as to form a predetermined angle with the water 1 contained in the water tank 10.

That is, a water surface a of the water 1 contained in the water tank 10 and a rotational axis b corresponding to the longitudinal direction of the rotating shaft 100 may be fixed to form a specific angle θ with each other.

The rotating body 200 is formed to collect the air and rotates while being immersed in some of the water 1 contained in the water tank 10 to introduce air outside the water 1 into the water 1 and purify the air by discharging the introduced air from the inside of the water 1.

The rotating body 200 may include a rotating center body 220 through-coupled with the rotating shaft 100 and having a hollow shape, and the rotating blades 210 may be formed to be spaced apart from each other at equal intervals along the outer periphery of the rotating center body 220.

The rotating body 200 may be separated from the rotating shaft and the rotating blades 210 may be formed to be separated from the rotating center body 220, thereby separating and cleaning all of the configurations of the rotating body 200.

To this end, the rotating body, the rotating shaft, and the rotating center body may include various fastening structures to couple or couple and separate coupling grooves and coupling protrusions at positions corresponding to each other.

Herein, the rotating blade 210 may include a curved portion 211 which is extended from the rotating center body 220 in an outer direction of the rotational axis and formed so that an end thereof is curved in one direction.

In particular, the curved portion 211 may be formed so that an end 211c is angled in one direction while being extended in the outer direction of the rotational axis, but is not limited thereto and may be formed to be gently curved.

Further, the curved portion 211 may be formed so that the end 211c is curved in a rotating direction of the rotating body 200 and accordingly, when the rotating body 200 rotates in a longitudinal direction of the rotating shaft 100 as the rotational axis, the air may be collected and introduced into the water 1.

Particularly, the curved portion 211 may be formed in a shape to minimize the buoyant force when the end 211c is introduced into the water 1, and minimize generated noise.

The rotating blade 210 may further include a closure portion 212 which is formed to be extended to one side 211a of the curved portion and collects the air together with the curved portion 211, and when the rotating blades 210 rotate, the air outside the water 1 may be introduced into the water 1 and the introduced air may be discharged from the inside of the water 1.

As such, the rotating body 200 is obliquely mounted to form a predetermined angle with the water surface formed by the water 1 contained in the water tank 10 to introduce the air outside the water 1 into the water 1 using low energy.

Further, as the rotating blades 210 rotate, the other side 211c of the curved portion may be opened to discharge the water 1 collected together with the air.

According to such a structure, the water gathered in the curved portion 211 during rotating may be discharged to the outside by rotating the rotating body 200.

That is, the rotating body 200 is obliquely formed and the other side 211c of the curved portion is opened, and as a result, the water collected together with the air may be naturally discharged toward the other side 211c of the curved portion.

Figure 3A:
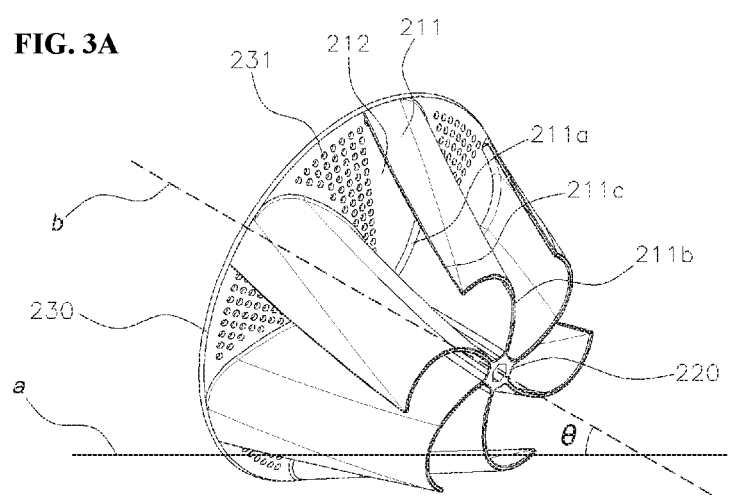
FIG. 3A is a perspective view of a rotating body according to another exemplary embodiment of the present invention.
Figure 3B:
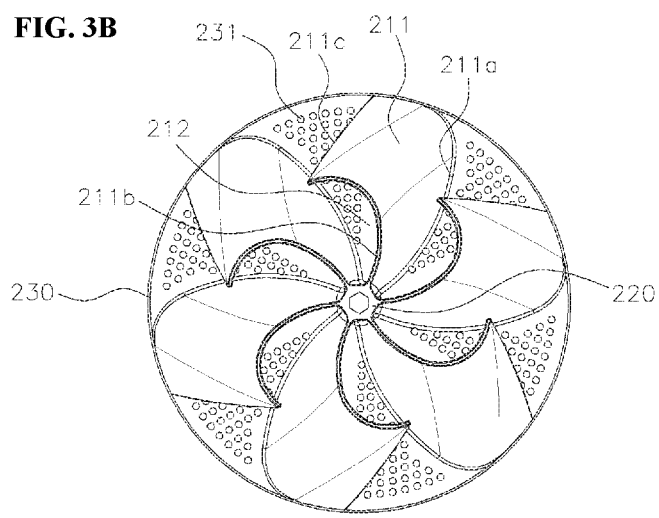
FIG. 3B is a front view of the rotating body according to another exemplary embodiment of the present invention.
Figure 3C:
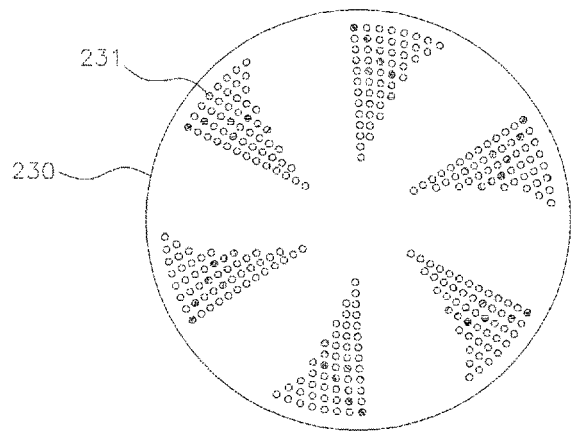
FIG. 3C is a rear view of the rotating body according to another exemplary embodiment of the present invention.

FIG. 3A is a perspective view of a rotating body according to another exemplary embodiment of the present invention, FIG. 3B is a front view of the rotating body according to another exemplary embodiment of the present invention, and FIG. 3C is a rear view of the rotating body according to another exemplary embodiment of the present invention.

Referring to FIGS. 3A to 3C, the rotating blades 210 may be installed with a disk-shaped plate 230 which is coupled to one side 211a of the curved portion and collects the air together with the curved portion 211, and when the rotating blades 210 rotate, the air outside the water 1 may be introduced into the water 1 and the introduced air may be discharged from the inside of the water 1.

Particularly, the plate 230 may include a closure portion 212 for collecting the air together with the curved portion 211 to introduce the collected air into the water 1, and air crush portions 231 which discharge the collected air from the inside of the water 1 when the rotating blades 210 rotate and are formed to penetrate the plate 230 in a thickness direction to crush and discharge the discharged air into a plurality of air bubbles.

In this case, the air crush portions 231 may include all of a plurality of through holes, meshes, various ducts, and the like.

The rotating body 200 may be obliquely mounted so that one side 211a of the curved portion is upward and the other side 211b of the curved portion 211 is downward, and the air introduced into the water 1 moves in a direction of the plate 230 by the density difference and is crushed through the air crush portions 231 formed in the plate 230 to be discharged as the plurality of air bubbles.

In other words, in the plate 230, the closure portion 212 is formed in a curved direction of the curved portion 211 from one side 211a of the curved portion to collect the air, and the air crush portions 231 may be formed between the closure portion 212 of the rotating blade 210 and another rotating blade 210 adjacent to the rotating blade 210.

According to such a structure, a contact surface area between the air and the water 1 is maximized, thereby largely improving air purification efficiency.

Similarly, as the rotating blades 210 rotate, the other side 211b of the curved portion may be opened to discharge the water 1 collected together with the air.

According to such a structure, the water 1 gathered in the curved portion 211 during rotating may be discharged to the outside by rotating the rotating body 200.

Figure 4:
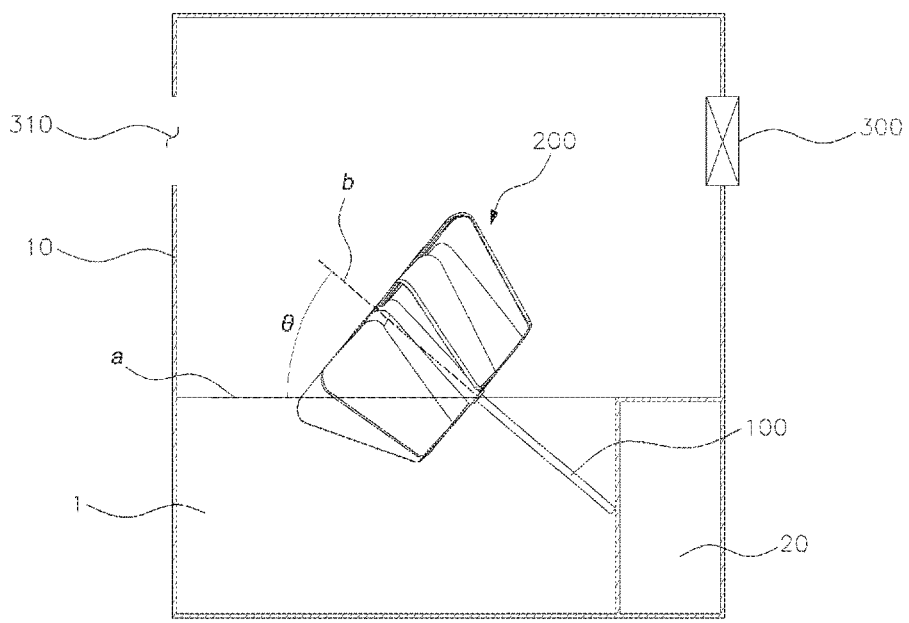
FIG. 4 is a schematic diagram of an air cleaner according to another exemplary embodiment of the present invention.

FIG. 4 is a schematic diagram of an air cleaner according to another exemplary embodiment of the present invention.

Referring to FIG. 4, the water tank 10 may include an air introduction portion 300 mounted with a fan for forcibly introducing air outside the water tank 10 to one side. Further, the water tank 10 may include an air discharge port 310 which is formed on the other surface to be opened with a predetermined size to discharge the air in the water tank 10.

In this case, the air outside the water tank 10 is forcibly introduced into the water tank 10 and may be purified by the rotating body 200 and the water 1, and the purified air may be discharged outside the water tank 10 through the air discharge port 310.

Figure 5:
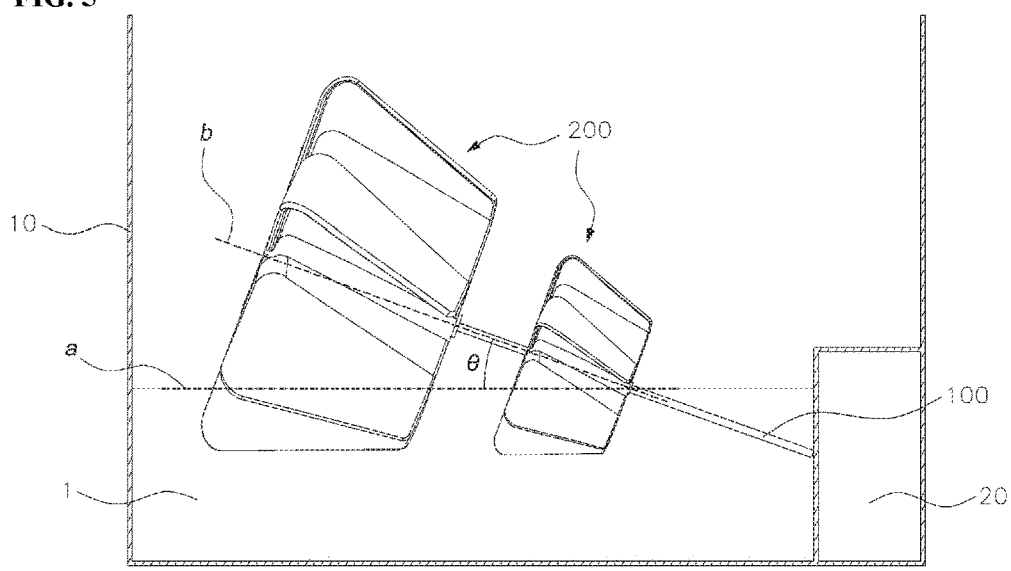
FIG. 5 is a schematic diagram of an air cleaner according to yet another exemplary embodiment of the present invention.

FIG. 5 is a schematic diagram of an air cleaner according to yet another exemplary embodiment of the present invention.

Referring to FIG. 5, a plurality of rotating bodies 200 is formed and the plurality of rotating bodies 200 may have different sizes so that lowest heights thereof coincide with each other based on the bottom surface of the water tank 10.

According to such a structure, the number of rotating bodies 200 is increased according to the size of the water tank 10, thereby improving the air purification efficiency.

Although the exemplary embodiments of the present invention have been described, of course, various modifications can be made without departing from the technical concept of the present invention. Therefore, the scope of the present invention should not be limited to the exemplary embodiments described above and should be determined by appended claims and equivalents to the appended claims.

As described above, although the present invention is described by the restrictive exemplary embodiments and the drawings, the present invention is not limited to the exemplary embodiments, and it will be apparent to those skilled in the art that various modifications and variations can be made from the disclosure. Therefore, the spirit of the present invention should be construed based on only the appended claims, and all equivalent or equal modifications thereof should be construed as falling within the scope of the present invention.

The invention claimed is:

1. An air cleaner, comprising:
   a water tank configured to contain water;
   a rotating shaft mounted in the water tank and configured to rotate; and
   a rotating body coupled to the rotating shaft and configured to rotate in a longitudinal direction of the rotating shaft as a rotational axis and comprising a plurality of rotating blades capable of collecting air,
   wherein the rotating shaft is obliquely mounted in a predetermined acute angle with a water surface defined by the water contained in the water tank, and
   wherein the rotating body is configured to rotate while being partially immersed in the water contained in the water tank to introduce air outside the water into the water and to discharge the introduced air from an inside of the water.

2. The air cleaner of claim 1, wherein at least a part of an upper portion of the water tank is open to allow the air to be freely introduced and discharged.

3. The air cleaner of claim 1, wherein the rotating body includes a rotating center body through-coupled with the rotating shaft and having a hollow shape, and wherein the plurality of rotating blades are disposed to be spaced apart from each other at equal intervals along an outer periphery of the rotating center body.

4. The air cleaner of claim 3, wherein each of the plurality of rotating blades includes a curved portion extending from the rotating center body in an outer direction of the rotational axis and an end thereof is curved in one direction.

5. The air cleaner of claim 4, wherein the end of the curved portion is curved in a rotating direction of the rotating body.

6. The air cleaner of claim 4, wherein the each of the plurality of rotating blades further includes a closure portion extending to one side of the curved portion and configured to collect the air together with the curved portion, and
wherein when the plurality of rotating blades rotate, the air outside the water is introduced into the water and the introduced air is discharged from the inside of the water.

7. The air cleaner of claim 6, wherein as the plurality of rotating blades rotate, an other side of the curved portion is open to discharge collected water together with the air.

8. The air cleaner of claim 4, wherein the plurality of rotating blades are installed with a disk-shaped plate coupled to one side of the curved portion and configured to collect the air together with the curved portion, and
wherein when the plurality of rotating blades rotate, the air outside the water is introduced into the water and the introduced air is discharged from the inside of the water.

9. The air cleaner of claim 8, wherein the plate comprises:
a closure portion configured to collect the air together with the curved portion to introduce the collected air into the water; and
air crush portions configured to discharge the collected air from the inside of the water when the plurality of rotating blades rotate and to penetrate the plate in a thickness direction to crush and discharge the discharged air into a plurality of air bubbles,
wherein the collected air moves in a direction of the plate by a density difference between the collected air and the water and is crushed through the air crush portions to be discharged as the plurality of air bubbles.

10. The air cleaner of claim 9, wherein as the plurality of rotating blades rotate, an other side of the curved portion is open to discharge collected water together with the air.

11. The air cleaner of claim 1, wherein the water tank comprises an air introduction portion mounted with a fan for forcibly introducing air outside the water tank into the water tank.

12. The air cleaner of claim 11, wherein the water tank further comprises an air discharge port configured to be open to discharge the air from the water tank.

13. The air cleaner of claim 1, further comprising a plurality of rotating bodies, wherein the plurality of rotating bodies have different sizes and lowest heights thereof coincide with each other based on a bottom surface of the water tank.

* * * * *